(12) United States Patent
Sridharan et al.

(10) Patent No.: US 11,334,405 B2
(45) Date of Patent: May 17, 2022

(54) DISTRIBUTED PERSISTENT QUEUE FACILITATING STATE MACHINE REPLICATION

(71) Applicant: VMware, Inc., Palo Alto, CA (US)

(72) Inventors: Sundar Sridharan, Fremont, CA (US); Maithem Munshed, Palo Alto, CA (US); Srinivas Neginhal, Belmont, CA (US); Medhavi Dhawan, Saratoga, CA (US); Pavan kumar Anumula, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 353 days.

(21) Appl. No.: 16/711,953

(22) Filed: Dec. 12, 2019

(65) Prior Publication Data
US 2021/0182130 A1    Jun. 17, 2021

(51) Int. Cl.
*G06F 16/00* (2019.01)
*G06F 9/54* (2006.01)
*G06F 16/182* (2019.01)
*H04L 67/1097* (2022.01)
*G06F 16/18* (2019.01)

(52) U.S. Cl.
CPC ............ *G06F 9/546* (2013.01); *G06F 16/182* (2019.01); *G06F 16/1805* (2019.01); *H04L 67/1097* (2013.01)

(58) Field of Classification Search
CPC ...................................................... G06F 9/546
USPC ............................................................ 707/799
See application file for complete search history.

(56) References Cited

U.S. PATENT DOCUMENTS 10,891,366 B1 * 1/2021 Wu ........................ H04L 9/0894
                                                              707/707

* cited by examiner

*Primary Examiner* — Alexandria Y Bromell
(74) *Attorney, Agent, or Firm* — Patterson + Sheridan, LLP

(57) ABSTRACT

Disclosed are a method and system for implementing a distributed persistent queue. To implement the queue, an API is defined that includes a command to enqueue an object onto the queue, to obtain the ordering of all objects in the queue and to remove any item from the queue. Enqueuing an object includes obtaining a unique ID for the object from a generator and then storing the object in a persistent shared log, which provides persistent storage for the queue. Obtaining an ordering of all objects in the persistent queue includes receiving for each object stored in the queue a pair of values, the first being the unique ID and the second being a sequence number from the persistent shared log. Regardless of the host computer system making the request for the ordering of objects in the queue the ordering provided to each host computer system is the same.

20 Claims, 9 Drawing Sheets

DISTRIBUTED PERSISTENT QUEUE FACILITATING STATE MACHINE REPLICATION

BACKGROUND

Queues are important structures in computing. Conventionally, a queue is implemented as a single structure in the memory of a single computing system so that the order of its elements is well known by the computing system. However, in a cluster of computer systems, such a queue has to have multiple shared copies among computer systems in a cluster if each computer system in a cluster needs to know the order of the elements in the queue. Sharing copies of a single queue is inefficient and error-prone because of the copying and duplication of the queue among the computer systems in the cluster.

A different type of structure is needed when there are multiple computer systems and only one queue that each of the host computer systems must use. For example, if each host computer system in a cluster implements a replicated state machine, it is important that each computer system have access to a globally-ordered set of objects or events so that each state machine sees the same inputs among the computer systems in the cluster. A structure that provides the globally-ordered set of objects or events is called a distributed persistent queue.

DETAILED DESCRIPTION

Embodiments herein provide a distributed persistent queue. Elements in the distributed persistent queue include the object in the queue as well as time and ordering information so that the same queue structure can be relied upon by all of the computer systems having access to the queue to provide the same ordering of objects or events in the queue to those computer systems. The distributed persistent queue is not stored in any one host but resides in storage accessible to all of the computer systems. Applications, such as the Paxos consensus protocol, which uses replicated state machines, can be implemented using the distributed persistent queue.

The distributed persistent queue obtains ordering information from a sequencer and time information from an ID generator. The sequencer, which in one embodiment, is a sequencer for the Corfu shared log, advances one step each time an element is entered into the distributed persistent queue, and the time information is provided by a timestamp whose drift and resolution are adjusted to form a unique ID. The combination of the sequencer and the unique ID from the ID generator guarantees the same ordering of events for any computer system that accesses the queue.

Figure 1A:
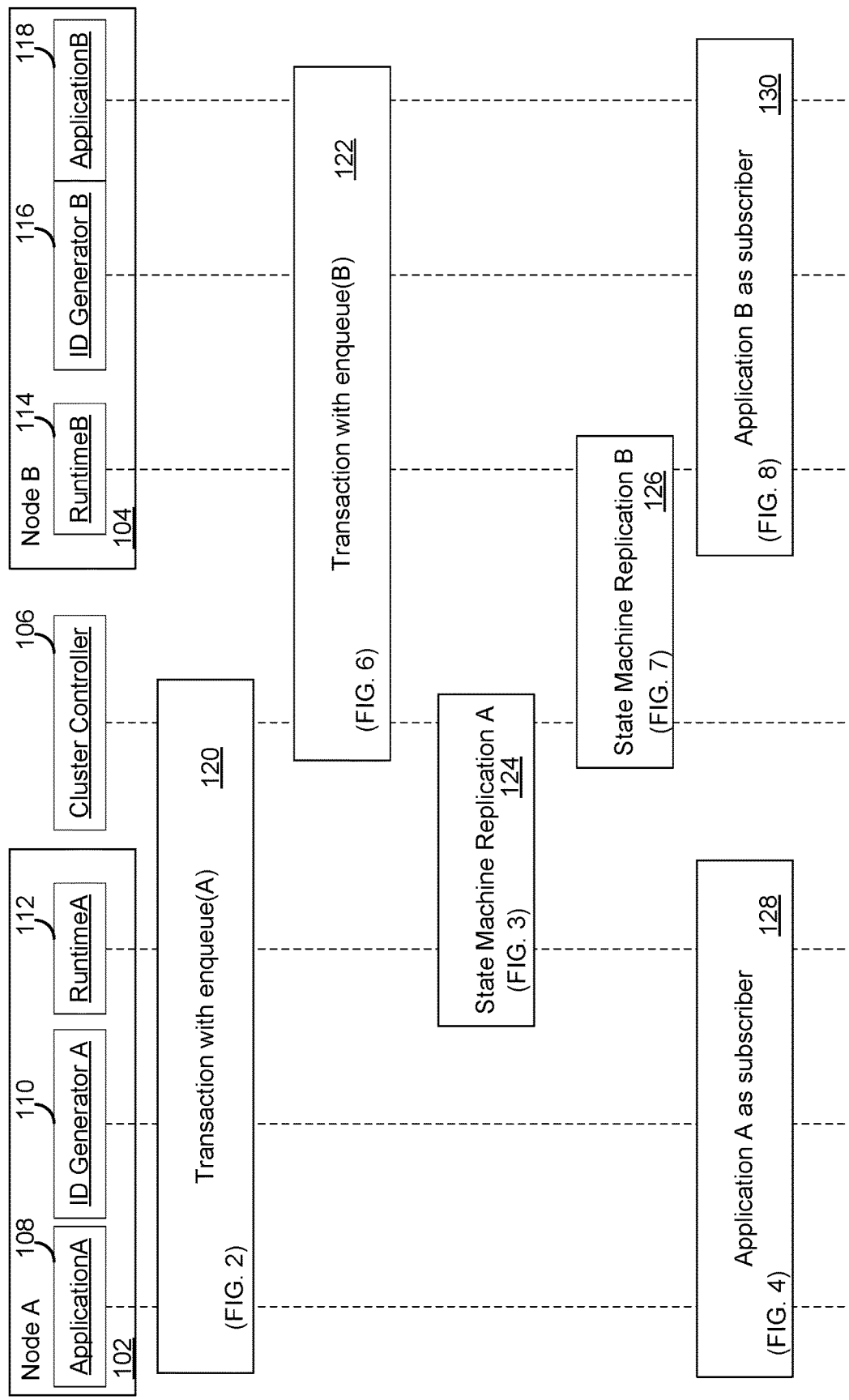
FIG. 1A depicts an example Corfu system that provides a persistent storage log.

FIG. 1A depicts applications using a persistent queue based on an example Corfu system, in an embodiment. The figure shows two nodes, Node A 102 and Node B 104 and a cluster controller 106. In one embodiment, the cluster controller 106 is a controller for the Corfu system 190 of FIG. 1C. Each node 102, 104 includes an application 108, 118, an ID generator 110, 116, and a runtime 112, 114.

Figure 2:
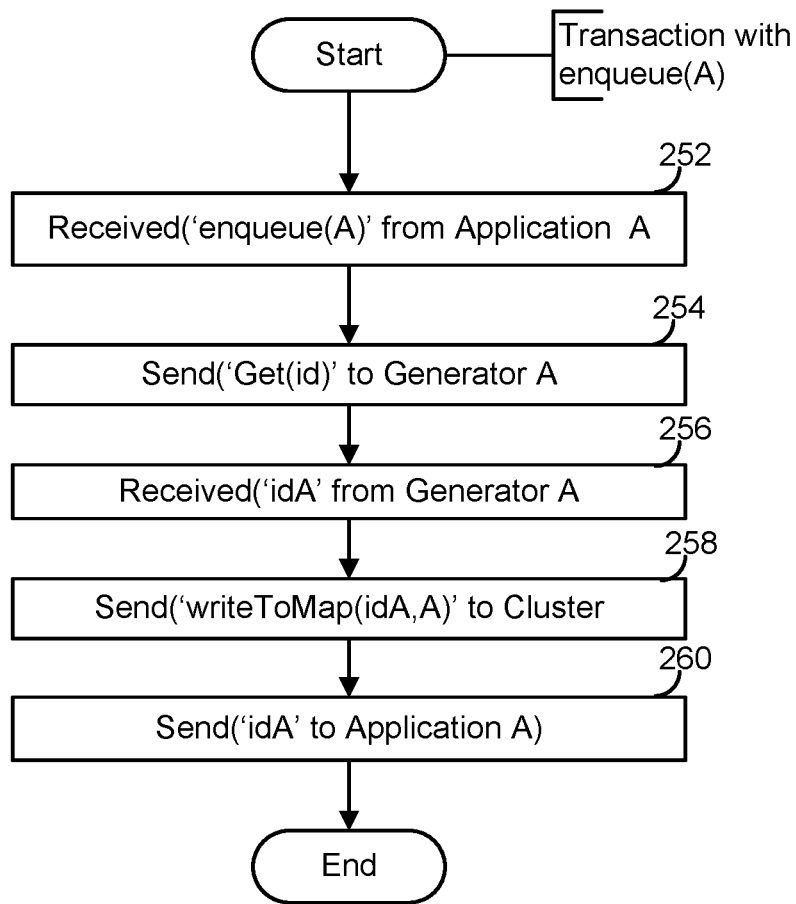
FIG. 2 depicts a flow of operations for a transaction that enqueues in a persistent queue an object A, in an embodiment.
Figure 6:
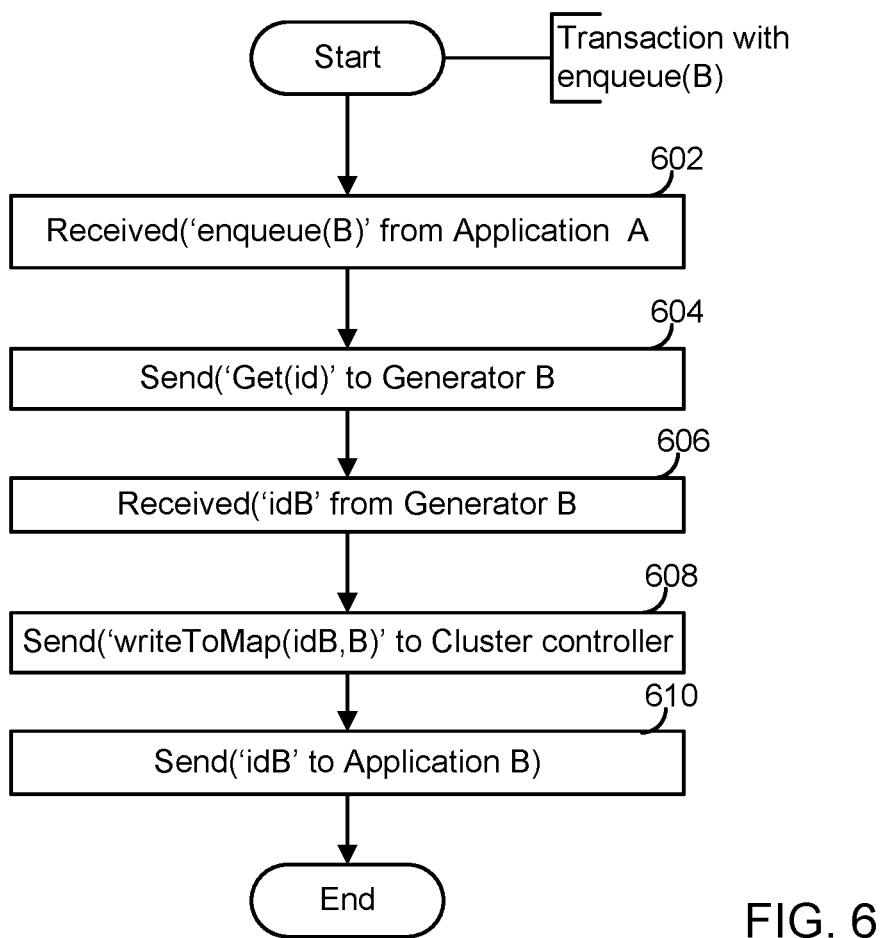
FIG. 6 depicts a flow of operations for a transaction that enqueues in the persistent queue an object B, in an embodiment.

Also shown in the figure are several functions, namely, Transaction with Enqueue(A) 120 and Transaction with Enqueue(B) 122, which are described in reference to FIGS. 2 and 6 respectively. Each of Transaction with Enqueue(A) and Transaction with Enqueue(B) includes the steps for entering an element into the distributed persistent queue, where entering an element into the queue involves getting a unique ID from the ID generator, writing data to a sequential append-only log, such as the Corfu log, and receiving the unique ID that was used. The functions, State Machine Replication A 124 and State Machine Replication B 126, are described in reference to FIGS. 3 and 7, respectively and include the steps for obtaining one or more elements from the distributed persistent queue and updating a node's information regarding the elements in the queue. The functions, Application A as subscriber 128 and Application B as subscriber 130 are described in reference to FIGS. 4 and 8, respectively and include the steps for reading a list of all of the entries in the distributed persistent queue. [Note to inventors: I've included the figure numbers mentioned in this paragraph in FIG. 1A for better clarity. Also, I've rotated the diagram to make sure that no part gets cut off in viewing. You should see box 128 and box 130 at the bottom of the figure.]

Figure 1B:
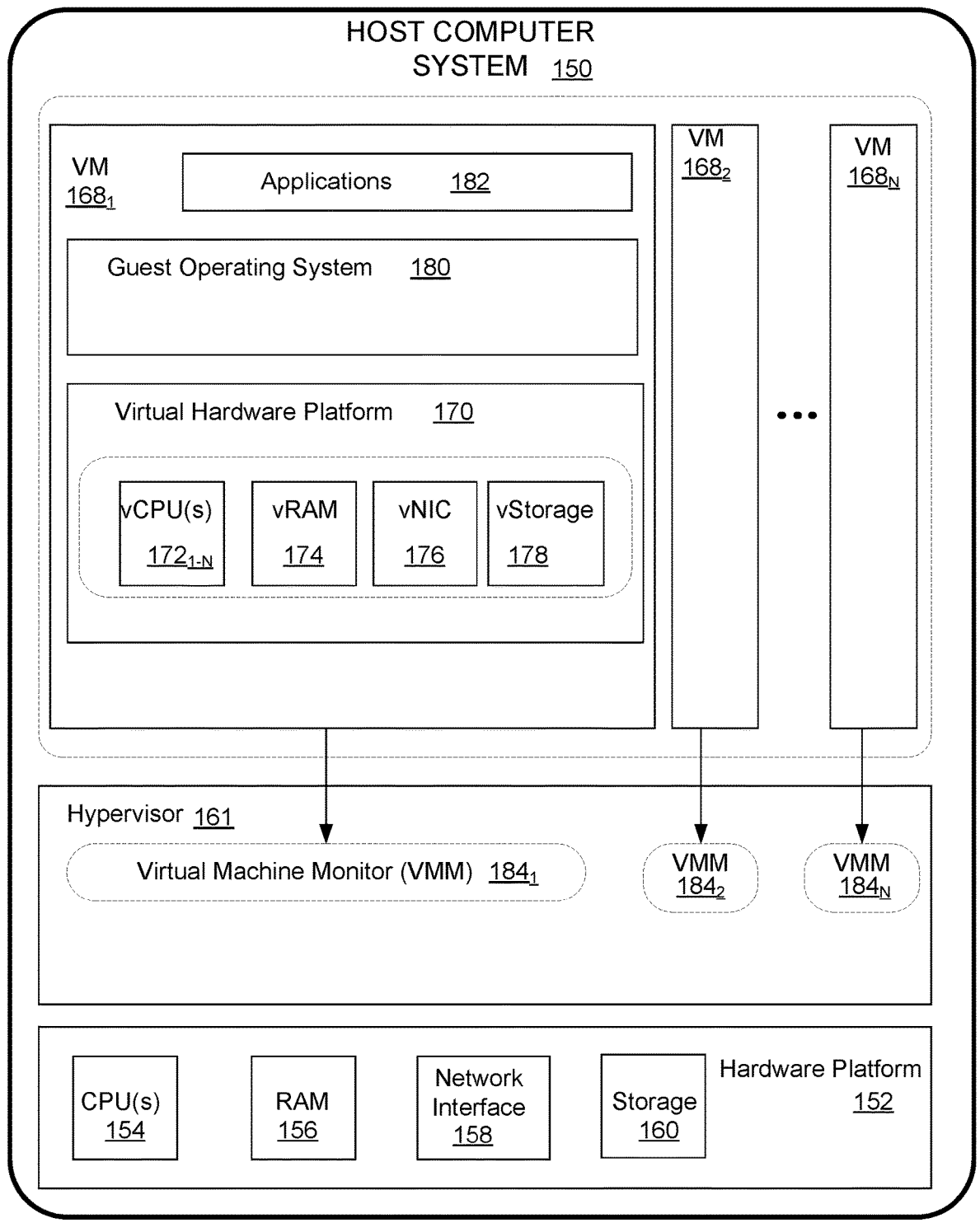
FIG. 1B depicts a block diagram of a computer system that may serve as a host computer system, such as nodes depicted in FIG. 1A.

FIG. 1B depicts a block diagram of a computer system 150 that may serve as nodes 102, 104 depicted in FIG. 1A. FIG. 1B is representative of a virtualized computer architecture. As is illustrated, host computer system 150 supports multiple virtual machines (VMs) $168_1$-$168_N$, which are an example of virtual computing instances that run on and share a common hardware platform 152. Hardware platform 152 includes conventional computer hardware components, such as one or more central processing units (CPUs) 154, random access memory (RAM) 156, one or more network interfaces 158, and persistent storage 160.

A virtualization software layer, hereinafter referred to as a hypervisor 161, is installed on top of hardware platform 152. Hypervisor 161 makes possible the concurrent instantiation and execution of one or more VMs $168_1$-$168_N$. The interaction of a VM 168 with hypervisor 161 is facilitated by the virtual machine monitors (VMMs) $184_1$-$184_N$. Each VMM $184_1$-$184_N$ is assigned to and monitors a corresponding VM $168_1$-$168_N$. In one embodiment, hypervisor 161 may be a VMkernel™ which is implemented as a commercial product in VMware's vSphere® virtualization product, available from VMware™ Inc. of Palo Alto, Calif. In an alternative embodiment, hypervisor 161 runs on top of a host operating system, which itself runs on hardware platform 152. In such an embodiment, hypervisor 161 operates above an abstraction level provided by the host operating system.

After instantiation, each VM $168_1$-$168_N$ encapsulates a virtual hardware platform 170 that is executed under the control of hypervisor 161. Virtual hardware platform 170 of VM $168_1$, for example, includes but is not limited to such virtual devices as one or more virtual CPUs (vCPUs) $172_1$-$172_N$, a virtual random access memory (vRAM) 174, a virtual network interface adapter (vNIC) 176, and virtual storage (vStorage) 178. Virtual hardware platform 170 supports the installation of a guest operating system (guest OS) 180, which is capable of executing applications 182, which can include application A 108, ID generator A 110, Runtime A 112 and Application B 118, ID Generator 116 and Runtime B 114. In an embodiment, ID Generator A 110, ID Generator B 116 are implemented as applications. In an embodiment, Runtime A 112 and Runtime B 114 run within Java Virtual Machines (JVMs). Examples of guest OS 180 include any of the well-known operating systems, such as the Microsoft Windows™ operating system, the Linux™ operating system, and the like.

Figure 1C:
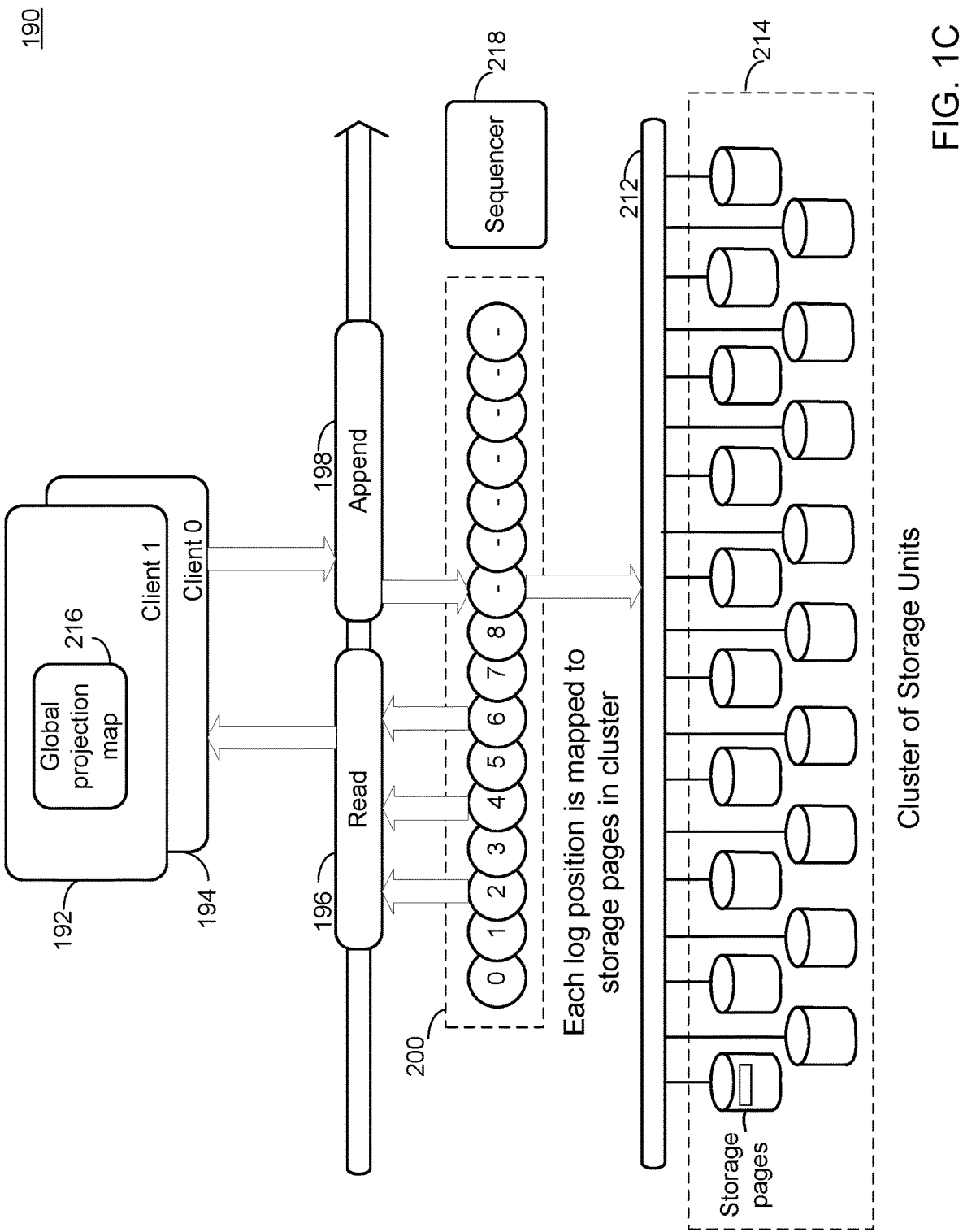
FIG. 1C depicts applications using a persistent queue based on the example Corfu system, in an embodiment.

FIG. 1C depicts an example Corfu system 190, which is a system that provides elements that can provide the storage persistence needs of a variety of applications. The system depicted includes one or more Corfu clients 192, 194, which may be instances of host computer system 150, or other computing devices, each having a cluster of storage units 214, a distributed shared log 200, a global projection map 216 and, each of which has a plurality of storage pages. Cluster of storage units 214, in one embodiment, is a storage array network (SAN) or network attached storage (NAS) containing physical storage units. Shared log 200 is an abstraction of a log file whose entries are stored in the physical storage units. Global projection map 216, which is maintained at the clients, projects each position (i.e., entry) of shared log 200 onto storage pages in the cluster of storage units 214. A Corfu client 192, 194 can perform a read 196 of the shared log 200 anywhere in shared log 200 by using the client's local copy of map 216 to determine a corresponding physical storage page and then issuing a read to the storage unit storing that page. A client 192, 194 can perform an append 198 to the end of the shared log 200 by determining the next available position in shared log 200, using a central sequencer 218 to avoid conflicts with other clients, and then writing data directly to the set of physical storage pages mapped to that position. Writing is conditioned on central sequencer 218 providing a sequential token to each client attempting to write shared log 200 so that each client writes sequentially to shared log 200. The token guarantees that each log position is written (i.e., appended to) only once because no two clients ever get the same token. Thus, the shared log 200 is a read-many, write-once distributed log.

In an embodiment, an Application Programming Interface (API) is defined over the abstraction of the Corfu distributed shared log to implement a distributed persistent queue. The API includes an enqueue(E) command, an entryList( ) command and a remove(id) command. The enqueue(E) command obtains a unique ID and stores the object E in the distributed shared log. The enqueue(E) command returns the unique ID to the caller, e.g., the application 108, 118. The entryList( ) command returns a list of all of the entries along with their IDs. Each entry in the list that is returned has a global ordering based on the sequence number when the object is stored in the distributed shared log and the unique ID. The remove(id) command removes any entry selected based on its ID from the distributed persistent queue. Implementation of these commands is described in reference to FIGS. 2-8.

FIG. 2 depicts a flow of operations for a transaction that enqueues in a persistent queue object an object A, in an embodiment. In step 252, runtime A 112 receives an enqueue (A) command from application A 108 using the API. In step 254, runtime A 112 sends a Get(id) request to generator A 110. Generator A 110 provides a unique ID and is further described in reference to FIG. 9. In step 256, runtime A 112 receives the requested ID, now referred to as IDA, from generator A 110. In step 258, runtime A 112 sends a writeToMap(idA, A) to the cluster controller 106. The writeToMap(idA, A) requests that the cluster controller 106 store the object A with IDA in shared storage log 200 of the cluster controller 106, using the append operation as described above. The cluster controller 106 responds and assigns to object A a cluster controller address, AddressA. In one embodiment, the cluster controller 106 is a Corfu Cluster controller and AddressA is a sequence number (also called a token) obtained from the sequencer 218 residing on the Corfu Cluster Controller. In step 260, runtime A 112 sends the IDA to application A 108, informing application A 108 of the ID, IDA.

Figure 3:
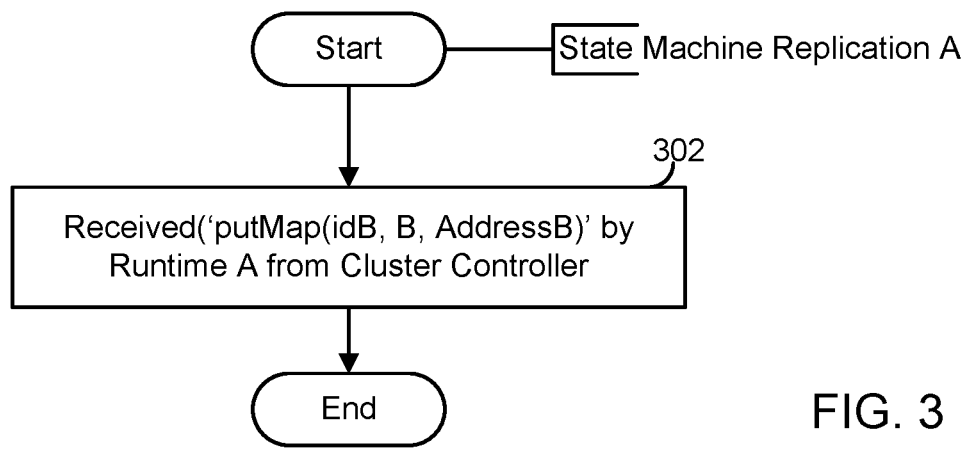
FIG. 3 depicts a flow of operations for state machine replication for application A, in an embodiment.

FIG. 3 depicts a flow of operations for use in state machine replication for application A, in an embodiment. In step 302, runtime A 112 receives a putMap(idB, B, AddressB) command from the cluster controller 106. The putMap function provides runtime A 112 with the pair (AddressB, IDB) from the writeToMap operation performed by node B, which is further described in reference to FIG. 6. The putMap command thus informs runtime A of the addition of an element to the distributed persistent queue by another node, in this case, node B.

Figure 4:
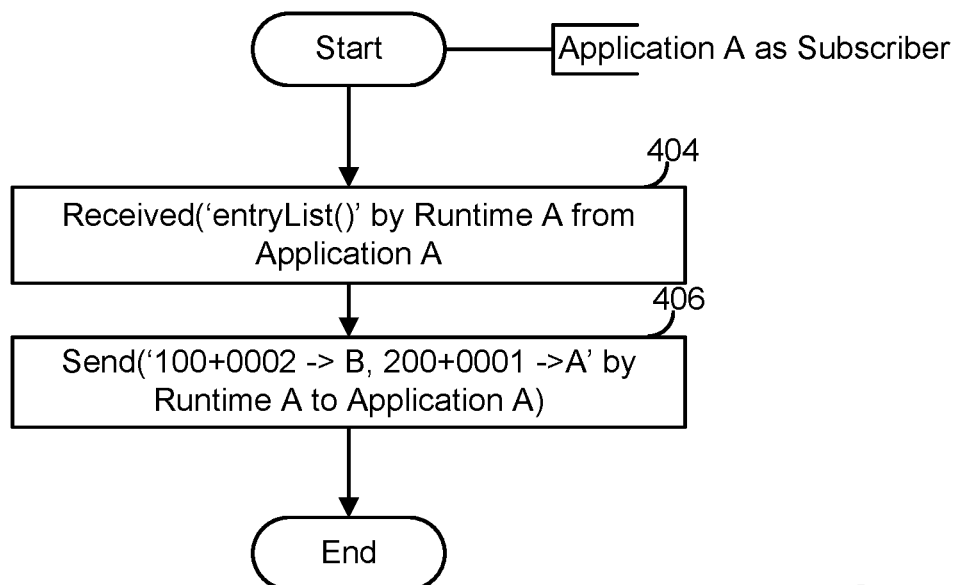
FIG. 4 depicts a flow of operations for application A as a subscriber, in an embodiment.

FIG. 4 depicts a flow of operations for application A as a subscriber, in an embodiment. In step 402, runtime A 112 receives an entryList( ) command from application A 108 using the API. In step 404, runtime A 112 responds by sending the pair (AddressB, IDB) for object B and the pair (AddressA, IDA) for object A. The pair (AddressB, IDB) and the pair (AddressA, IDA) provide a unique ordering of objects A and B as entries in the persistent queue. Receiving the pair of values for each object allows application A to provide input for a replicated state machine in application A.

Figure 5:
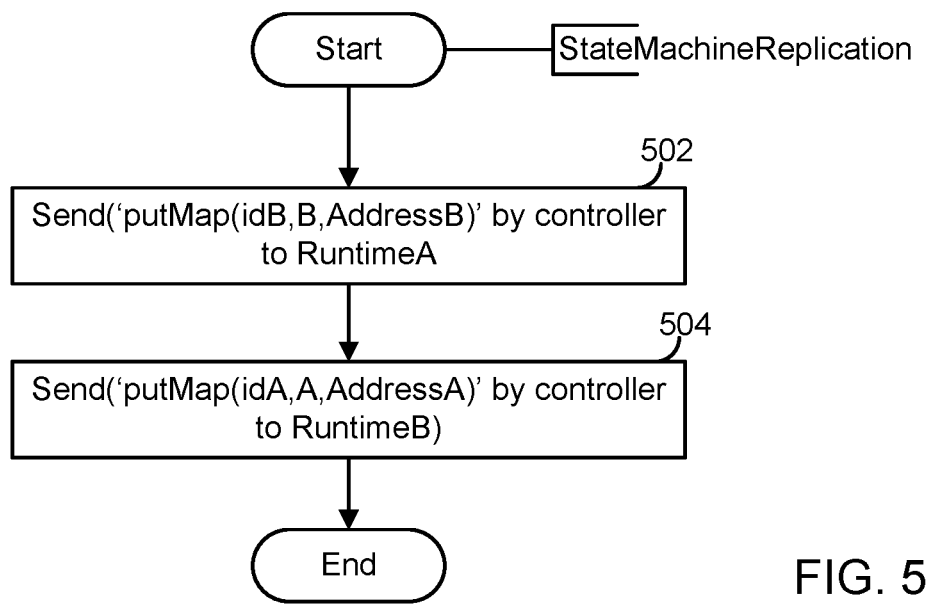
FIG. 5 depicts a flow of operations for state machine replication at the cluster controller, in an embodiment.

FIG. 5 depicts a flow of operations for use in state machine replication at the cluster controller, in an embodiment. In step 502, the cluster controller 106 sends the map results to runtime A 112 using a put map function. In step 504, the cluster controller 106 sends the putMap results to runtime B 114.

FIG. 6 depicts a flow of operations for a transaction that enqueues in the persistent queue object an object B, in an embodiment. In step 602, runtime B 114 receives an enqueue object B request from application B 118. In step 604, runtime B 114 sends a Get(id) to generator B 116. In step 606, runtime B 114 receives the requested ID from generator B 116. In step 608, runtime B 114 sends a writeToMap(idB, B) to the cluster controller 106. The writeToMap request causes object B with IDB to be enqueued in the persistent queue and assigns an addressB to object B. In one embodiment, address B is a sequence number assigned by the sequencer 218 in a controller, such as that in the Corfu system 190. In step 610, runtime B 114 sends the IDB to application B 118.

Figure 7:
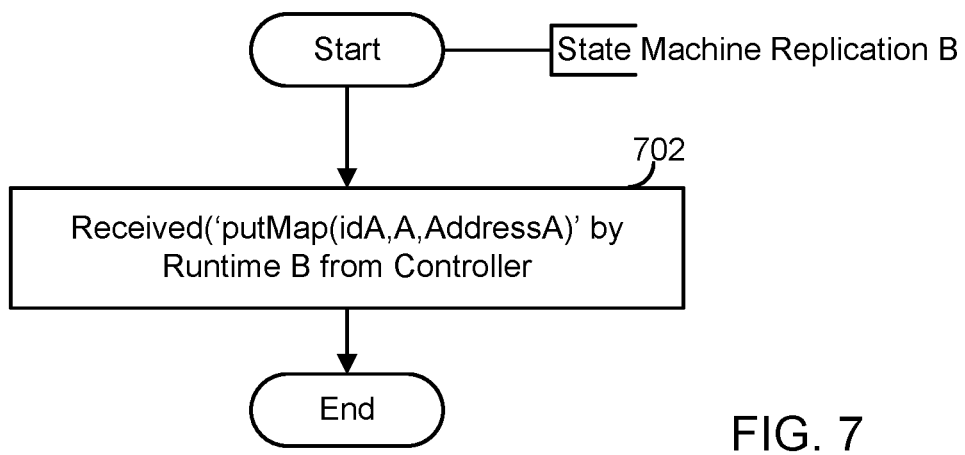
FIG. 7 depicts a flow of operations for state machine replication for application B, in an embodiment.

FIG. 7 depicts a flow of operations for use in state machine replication for application B, in an embodiment. In step 702, runtime B 114 receives a putMap(idA, A, AddressA) from the cluster controller 106, informing runtime B 114 of the pair (addressA, IDA) assigned to object A.

Figure 8:
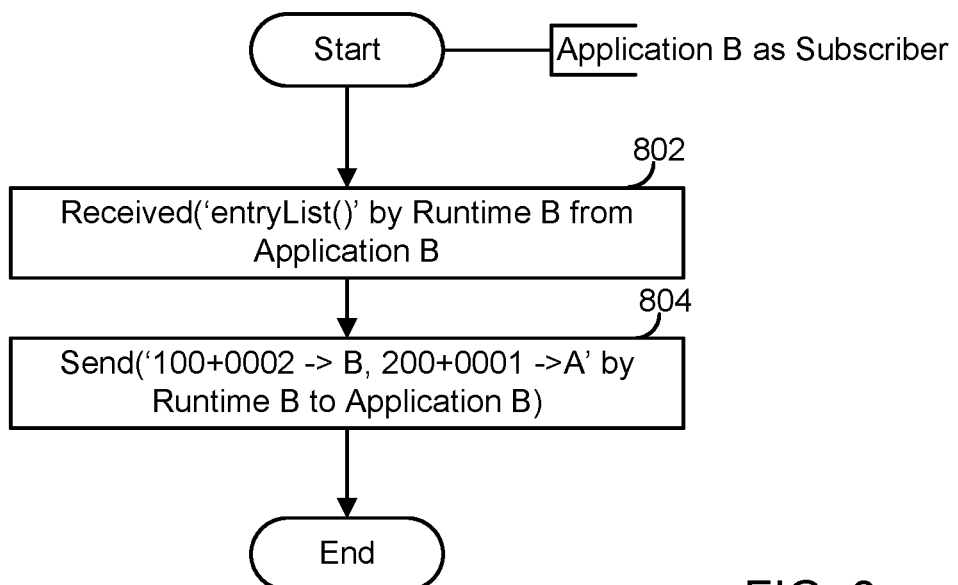
FIG. 8 depicts a flow of operations for application A as a subscriber, in an embodiment.

FIG. 8 depicts a flow of operations for application B as a subscriber, in an embodiment. In step 802, runtime B 114 receives an entryList( ) command from application B 118 using the API and in step 804, Application B receives from runtime B 114 a response that provides the pair (AddressB, IDB) and (AddressA, IDA). Thus, application B 114 now knows the correct ordering of object A and object B as entries in the distributed persistent queue. Application A 108 also received the same ordering. Receiving the pair of values for each object allows application B to input to a replicated state machine in application B. With both application A and application B receiving the same input, the replicated state machines in each application operate in the exact same input and thus make the same transitions.

Figure 9:
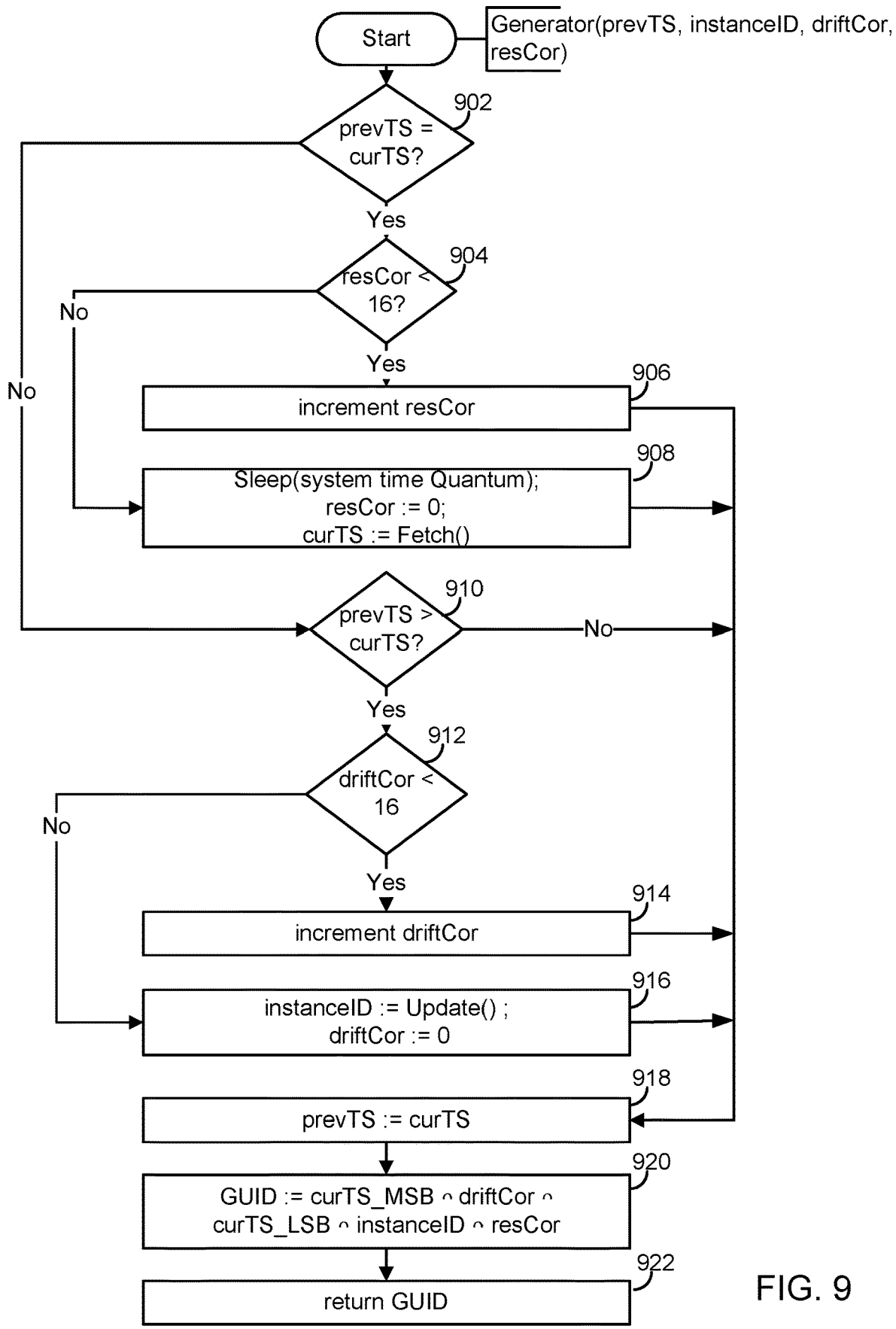
FIG. 9 depicts a flow of operations for the generator used in transactions, in an embodiment.

FIG. 9 depicts a flow of operations for the ID generator used in transactions, in an embodiment. The generator described herein generates IDs, e.g., of only eight (8) bytes, that are guaranteed to be unique across all nodes; no two nodes ever generate a duplicate ID. The generator creates thousands of IDs per second without need for accessing a network each time an ID is generated, and the IDs are monotonically increasing in that new IDs have values that are higher than older ones. Higher values can be determined by comparing one ID against another ID.

The inputs for the generator 110, 116 are a previous timestamp, prevTS, an instance ID, instanceID, a drift correction value, driftCor, and a resolution correction value, resCor.

The timestamps are obtained from coordinated universal time (UTC) using, for example, the Network Time Protocol (NTP) via a UDP message on port 123 and the previous timestamp is a current timestamp that was previously updated to the current time by the ID generator operation. However, a timestamp derived from UTC is not a reliably unique number as it can drift backwards and its resolution may be coarse when many ID generators operate simultaneously. The ID generator corrects the drift by detecting whether the current timestamp is older than the previous timestamp and the ID generator improves the resolution by determining if the current timestamp is the same as the previous timestamp because the two time stamps should be distinguishable. The ID generator can tolerate, e.g., up to 16, time adjustments without re-synchronizing to the current time and can tolerate, e.g., up to 65 seconds of drift without loss of ordering.

In FIG. 9, steps 902-908 perform the resolution correction and steps 910-916 perform the drift correction. In some embodiments, the generator performs only drift corrections or only resolution corrections.

In step 902, the generator 110, 116 tests prevTS with the current timestamp, curTS. If prevTs equals curTS, then in step 904, the generator 110, 116 tests the resolution correction value to determine if it is less than a decimal value of 16. It should be noted that other values may be used alternatively. If so, then in step 906, the generator 110, 116 increments the resCor value. If resCor is not less than 16, then the generator 110, 116 in step 908, the generator 110, 116 sleeps for a system time quantum, sets the resCor value to zero, and fetches the current timestamp, thus resynchronizing to the UTC clock only if the resolution correction equals or exceeds 16.

In step 910, the generator 110, 116 tests the previous timestamp to determine if it is greater than the current timestamp. If so, then in step 912, the generator 110, 116 tests the driftCor value to determine if it is less than a decimal value of 16. If so, then in step 914, the generator 110, 116 increments the driftCor value. If not, then in step 916, the generator 110, 116 updates the instance ID and sets the driftCor value to zero. The instance ID allows the generator to handle a large number of drift corrections because each time the driftCor value exceeds 16, the instance ID is incremented, and the driftCor value is re-initialized. Thus, the total amount of drift correction is derived from the decimal value of 16 and the instance ID, which counts the number of times, up to decimal 65,346, the correction exceeds the decimal value of 16.

After either the drift correction or the resolution correction, the generator 110, 116, in step 918, advances the previous timestamp by setting the previous timestamp to the current time stamp and in step 920 forms the unique ID number. The unique ID number is formed by concatenating (symbolized by ⌒), e.g., the three most significant bytes (MSBs) of, the current time stamp (3 bytes), the driftCor value (0.5 bytes), e.g., the two least significant bytes (LSBs) of, the current timestamp (2 bytes), the instance ID (2 bytes) and/or the resolution correction value (0.5 bytes) resulting in a unique ID number that is, e.g., eight (8) bytes. In step 922, the generator 110, 116 returns the unique ID number. Thus, the generator in each node provides an ID (i.e., a timestamp) that is guaranteed to be distinct regardless of the generator that created it, in effect creating a version of a global clock.

Thus, the use of a shared log, whose updates are controlled by a sequencer, along with a unique ID generator, guarantees a unique global ordering of queue entries stored in the shared log throughout a number of nodes. The queue, with its unique global ordering provides a mechanism which each host computer system can use to implement an application, such as a replicated state machine common in consensus protocols, because each application, using the global view of events or objects in the queue, can provide the same transitions to their respective state machines.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system—computer-readable media may be based on any existing or subsequently developed technology for embodying computer programs in a manner that enables them to be read by a computer. Examples of a computer-readable medium include a hard drive, solid state drive (flash memory device), phase change memory, persistent memory, network attached storage (NAS), read-only memory, random-access memory, a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for enqueuing objects in a distributed persistent queue available to a plurality of computer systems including a first computer system and a second computer system, the method comprising:
   receiving a first unique ID from a first ID generator available to the first computer system, wherein the first ID generator is configured to generate the first unique ID as unique across the plurality of computer systems based on a current timestamp associated with the first computer system and a drift correction value that corrects for time drift among the plurality of computer systems;
   requesting by the first computer system that a controller store a first object in the distributed persistent queue, the first object having the first unique ID and a first address assigned by the controller; and
   receiving a notice from the controller that a second object of the second computer system having a second unique ID and a second address was enqueued in the distributed persistent queue, wherein the second unique ID is generated by a second ID generator available to the second computer system and is unique across the plurality of computer systems;
   wherein the first computer system and the second computer system observe the same queueing order of the first object and the second object.

2. The method of claim 1, further comprising requesting from the controller contents of the distributed persistent queue, the contents indicating a queueing order of the first object and the second object, the queueing order based on the first unique ID, the first address, and the second unique ID and the second address.

3. The method of claim 1, wherein the first unique ID is further based on an instance ID that, in combination with the drift correction value, allows for drift corrections to exceed a threshold value.

4. The method of claim 1, wherein the first unique ID is further based on a resolution correction value that improves resolution of the current timestamp to guarantee uniqueness of the first unique ID.

5. The method of claim 1, wherein requesting that the controller store the first object is performed by issuing a write to map command to the controller with the ID and first object as parameters, wherein the write to map command causes the first object to be appended to an append-only log that is shared across the plurality of computer systems, the controller serializing each append operation to the append-only log.

6. The method of claim 1, wherein the second unique ID is assigned by a second ID generator available to the second computer system.

7. The method of claim 1, wherein the contents indicating the queuing order of the first and second object includes a first pair having the ID and address assigned to the first object and a second pair having the ID and address assigned to the second object.

8. The method of claim 7, wherein the queuing order is determined by comparing the first pair to the second pair.

9. A non-transitory computer-readable medium comprising instructions executable in a computer system, wherein the instructions when executed in the computer system cause the computer system to carry out a method for enqueuing objects in a distributed persistent queue available to a plurality of computer systems including a first computer system and a second computer system, the method comprising:
    receiving a first unique ID from a first ID generator available to the first computer system, wherein the first ID generator is configured to generate the first unique ID as unique across the plurality of computer systems based on a current timestamp associated with the first computer system and a drift correction value that corrects for time drift among the plurality of computer systems;
    requesting by the first computer system that a controller store a first object in the distributed persistent queue, the first object having the first unique ID and a first address assigned by the controller; and
    receiving a notice from the controller that a second object of the second computer system having a second unique ID and a second address was enqueued in the distributed persistent queue, wherein the second unique ID is generated by a second ID generator available to the second computer system and is unique across the plurality of computer systems;
    wherein the first computer system and the second computer system observe the same queueing order of the first object and the second object.

10. The non-transitory computer-readable medium of claim 9, further comprising requesting from the controller contents of the distributed persistent queue, the contents indicating a queueing order of the first object and the second object, the queueing order based on the first unique ID, the first address, and the second unique ID and the second address.

11. The non-transitory computer-readable medium of claim 9,
    wherein the first unique ID is further based on an instance ID that, in combination with the drift correction value, allows for drift corrections to exceed a threshold value; and
    wherein the first unique ID is further based on a resolution correction value that improves resolution of the current timestamp to guarantee uniqueness of the first unique ID.

12. The non-transitory computer-readable medium of claim 9, wherein requesting that the controller store the first object is performed by issuing a write to map command to the controller with the ID and first object as parameters, wherein the write to map command causes the first object to be appended to an append-only log that is shared across the plurality of computer systems, the controller serializing each append operation to the append-only log.

13. The non-transitory computer-readable medium of claim 9, wherein the second unique ID is assigned by a second ID generator available to the second computer system.

14. The non-transitory computer-readable medium of claim 9,
    wherein the contents indicating the queuing order of the first and second object includes a first pair having the ID and address assigned to the first object and a second pair having the ID and address assigned to the second object; and
    wherein the queuing order is determined by comparing the first pair to the second pair.

15. A plurality of computer systems comprising:
    a first computer system including a first ID generator;
    a second computer system including a second ID generator; and
    a controller coupled to the first computer system and the second computer system, and configured to maintain a log shared among the plurality of computer systems, the shared log providing storage for a distributed persistent queue;
    wherein the first computer system is configured to:
    receive a first unique ID from the first ID generator, wherein the first ID generator is configured to generate the first unique ID as unique across the plurality of computer systems based on a current timestamp associated with the first computer system and a drift correction value that corrects for time drift among the plurality of computer systems;
    request by the first computer system that the controller store a first object in the distributed persistent queue, the first object having the first unique ID and a first address assigned by the controller; and
    receive a notice from the controller that a second object of the second computer system having a second unique ID and a second address was enqueued in the distributed persistent queue, wherein the second unique ID is generated by the second ID generator and is unique across the plurality of computer systems;
    wherein the first computer system and the second computer system observe the same queueing order of the first object and the second object.

16. The plurality of computer systems of claim 15, wherein the first computer system is configured to request from the controller contents of the distributed persistent queue, the contents indicating a queueing order of the first object and the second object, the queueing order based on the first unique ID, the first address, and the second unique ID and the second address.

17. The plurality of computer systems of claim 15,
    wherein the first unique ID is further based on an instance ID that, in combination with the drift correction value, allows for drift corrections to exceed a threshold value; and
    wherein the first unique ID is further based on a resolution correction value that improves resolution of the current timestamp to guarantee uniqueness of the first unique ID.

18. The plurality of computer systems of claim 15, wherein requesting that the controller store the first object is performed by issuing a write to map command to the controller with the ID and first object as parameters, wherein the write to map command causes the first object to be appended to an append-only log that is shared across the plurality of computer systems, the controller serializing each append operation to the append-only log.

19. The plurality of computer systems of claim 15, wherein the second unique ID is assigned by a second ID generator available to the second computer system.

20. The plurality of computer systems of claim 15,
wherein the contents indicating the queuing order of the first and second object includes a first pair having the ID and address assigned to the first object and a second pair having the ID and address assigned to the second object; and
wherein the queuing order is determined by comparing the first pair to the second pair.

* * * * *